US007055250B2

(12) United States Patent
Allemann et al.

(10) Patent No.: US 7,055,250 B2
(45) Date of Patent: Jun. 6, 2006

(54) MACHINE TOOL FOR CUTTING PLATE AND SANDWICH PANELS

(75) Inventors: Marco Allemann, Untervaz (CH); Markus Schmid, Heimsheim (DE)

(73) Assignee: Trumpf Grusch AG, Grusch (CH)

( * ) Notice: Subject to any disclaimer, the term of this patent is extended or adjusted under 35 U.S.C. 154(b) by 247 days.

(21) Appl. No.: 10/327,827

(22) Filed: Dec. 23, 2002

(65) Prior Publication Data

US 2003/0121390 A1 Jul. 3, 2003

(30) Foreign Application Priority Data

Dec. 27, 2001 (DE) .......................... 201 20 984 U (51) Int. Cl.
*B26D 7/26* (2006.01)
*B27B 17/08* (2006.01)

(52) U.S. Cl. ........................... 30/377; 30/374; 30/382; 30/383

(58) Field of Classification Search ................. 30/121, 30/122, 312, 320, 321, 370–377, 381–391, 30/517, 519, 520; 83/574, 743, 745, 788, 83/794, 796, 810–812; 144/34.1, 34.2, 73
See application file for complete search history.

(56) References Cited

U.S. PATENT DOCUMENTS

| 1,811,577 | A | * | 6/1931 | Crowe | 30/391 |
|---|---|---|---|---|---|
| 2,860,671 | A | * | 11/1958 | Wilder | 30/122 |
| 2,879,814 | A | * | 3/1959 | Scott | 30/122 |
| 3,604,479 | A | | 9/1971 | Jordan | |
| 3,672,412 | A | * | 6/1972 | Albright | 83/801 |
| 3,845,556 | A | * | 11/1974 | Edmunson | 30/381 |
| 3,965,788 | A | * | 6/1976 | Granberg | 83/745 |
| 4,028,975 | A | | 6/1977 | Bennett | |
| 4,033,035 | A | * | 7/1977 | Trimmer | 30/122 |
| 4,160,319 | A | * | 7/1979 | Caruso | 30/122 |
| 4,272,889 | A | * | 6/1981 | Scott et al. | 30/371 |
| 4,649,644 | A | * | 3/1987 | Huddleston | 30/122 |
| 4,757,735 | A | * | 7/1988 | Olson | 83/797 |
| 4,760,646 | A | * | 8/1988 | Siegler | 30/382 |
| 4,821,415 | A | * | 4/1989 | Kress | 30/122 |
| 4,858,318 | A | * | 8/1989 | Anderson | 30/122 |
| 4,945,637 | A | * | 8/1990 | Anderson | 30/122 |
| 5,077,896 | A | * | 1/1992 | Rivera | 30/122 |
| 5,088,197 | A | * | 2/1992 | Anderson | 30/122 |

(Continued)

FOREIGN PATENT DOCUMENTS

DE 7904242 2/1979

(Continued)

*Primary Examiner*—Clark F. Dexter
(74) *Attorney, Agent, or Firm*—Pepe & Hazard LLP; Peter L. Costas (57) ABSTRACT

A machine for cutting plate-shaped workpieces, incorporates a tool guide (7), an operating handle (13), and a cutting tool (6) which revolves along the tool guide (7). By moving the operating handle (13), the tool guide (7) with its cutting tool (6) can be shifted from an idle position into an active position. In its idle position the cutting tool (6) is disengaged from, and, in its active position it is engaged in, the workpiece to be processed. Provided between the operating handle (13) and the tool guide (7) is a variable ratio transmission mechanism (14, 18) with a transmission ratio which varies with the movement of the operating handle (13) as a function of the position of the tool guide (7) and its cutting tool (6) relative to the workpiece.

11 Claims, 5 Drawing Sheets

U.S. PATENT DOCUMENTS

| | | | | |
|---|---|---|---|---|
| 5,390,715 | A | * | 2/1995 | Luscombe .............. 144/24.13 |
| 5,535,521 | A | * | 7/1996 | Alcorn ...................... 30/382 |
| 5,713,134 | A | * | 2/1998 | Stevens ..................... 30/376 |
| 6,038,775 | A | * | 3/2000 | Holladay ................... 30/376 |
| 6,158,322 | A | * | 12/2000 | Ornberg ..................... 83/796 |
| 6,397,452 | B1 | * | 6/2002 | Frosberg et al. .............. 29/505 |
| 6,408,730 | B1 | | 6/2002 | Tinner et al. |

FOREIGN PATENT DOCUMENTS

| | | |
|---|---|---|
| WO | WO 01/84910 A1 | 11/2001 |

\* cited by examiner

MACHINE TOOL FOR CUTTING PLATE AND SANDWICH PANELS

BACKGROUND OF THE INVENTION

This invention relates to a machine for cutting plate-shaped workpieces and especially sandwich plates, incorporating a tool guide with a revolving power-driven cutting tool as well as a manually operated handle by means of which the tool guide with the cutting tool can be moved from an idle position into an active position. In tis idle position, the cutting tool is disengaged from the workpiece and, in its active position, it engages in the workpiece to be cut.

A machine of this type has been described in German Patent No. U-298 15 228. The prior art device is a hand-operated machine tool in which a machine base unit is provided with a guide rail along which an endless cutting chain revolves in a continuous fashion. The machine base unit is mounted in a horizontally pivotable manner on a base plate that slides on the object workpiece.

For starting a cut in the workpiece the machine base unit with the guide rail and the revolving cutting chain is tilted around its pivotal axis on the base plate. From an idle position away from the workpiece, the guide rail with the cutting chain is lowered into the workpiece. This prior art machine is used for cutting sandwich plates or panels, i.e., multilayer workpieces whose individual layers differ from one another in terms of mechanical strength. Such multi-layer plates or panels typically consist of a foam core sandwiched between cover layers in the form of thin metal sheets, most commonly made of steel.

It is an object of this present invention to provide a manually movable cutting machine which is readily manipulatable.

Another object is to provide such a machine which provides good clear cutting action.

SUMMARY OF THE INVENTION

It has now been found that the foregoing and related objects may be readily attained in a machine for cutting plate-shaped workpieces comprising a housing; a tool guide pivotally mounted on the housing; a motor-drive cutting tool extending about the tool guide; and a grippable operating handle pivotably supported in the housing and operatively connected to the tool guide to shift the tool guide with the cutting tool from an idle position into an active position. In its idle position the cutting tool is disengaged from, and, in its active position, it is engaged in, the workpiece to be cut.

A variable ratio transmission mechanism is provided between the operating handles and tool guide, and it has a transmission ratio that varies with the movement of the operating handle as a function of the position of the tool guide and cutting tool relative to the workpiece.

The variation of the transmission ratio is so dimensioned that the amount of pressure that must be applied by the operator to move the operating handle from the idle position of the tool guide with its cutting tool into and throughout the cutting process is substantially uniform. The transmission mechanism between the operating handle and the tool guide is a lever transmission. The operating handle is mounted on an operator side pivot arm and can be pivoted together with the operator side pivot arm around the pivotal axis of the pivot arm.

In another embodiment, the tool guide provides the pivot arm on the side of the workpiece.

Desirably, there is included at least one scale indicating the respectively current maximum cutting depth of the cutting tool in the workpiece as a function of at least one respectively current position of the operating handle during its movement. There may also be included at least one scale indicating the position of the tool guide with its cutting tool relative to the workpiece at the current maximum cutting depth of the cutting tool.

The machine desirably includes a locking device for automatically locking the tool guide with its cutting tool in a position assumed during its movement. The locking device may be provided with a clamping mechanism that can be released against the action of an elastic restoring force.

The operating handle may be mounted on an operator side pivot arm, wherein the tool guide is connected to the operator side pivot arm by a transmission lever, and wherein there is included a locking device designed to engage in the operator side pivot arm so that the tool guide may be automatically locked in any of its respectively current positions during its movement.

Preferably, there is included a support handle, and the operating handle and the support handle are positioned along a line that extends parallel to the feed direction. As a result, with the tool guide and its cutting tool in the active position, the machine and the workpiece to be processed can be moved relative to each other in the feed direction.

As will be appreciated, the transmission mechanism between the manual operating handle and the tool guide allows the machine operator to optimally balance the amount of pressure applied on the operating handle relative to the force effectively applied in the cutting process between the tool guide and cutting tool and the workpiece. This capability is of particularly practical significance in view of the fact that moving the tool guide with the cutting tool from its idle position into its active position meets with a counteracting force, i.e., resistance from the workpiece that varies with the progressive phases of the tool movement.

Essentially at the start of the cut, the tool guide with the cutting tool must address the workpiece with substantially more pressure than is necessary toward the end of the cutting process. The gearing mechanism according to the invention generally or at least largely relieves the machine operator of the need to make adjustments to the amount of pressure applied by him and transmitted by the operating handle. The transmission mechanism in the machine according to the invention supports and adaptively manages the force needed by the tool guide and cutting tool for the various phases of the cutting process. Quite significantly, this also helps to avoid too much pressure by the cutting tool on the workpiece with resultant excessive wear or even damage to the cutting tool.

Substantial design flexibility as well as functional ruggedness are offered by the lever-type transmission mechanism provided between the operating handle and the tool guide in the design version of this invention.

A transmission mechanism that requires only a minimum of components, thus permitting for instance a small and light-weight design, is obtainable by locating the operating handle directly next to the pivot arm on the operator-side and/or by designing the tool guide itself as a pivot arm on the workpiece side.

The scales enable the operator to locate the point of attack on the object workpiece even though that point of attack is not within his or her field of view and in spite of the fact that, due to the variable transmission ratio, identical path lengths in the movement of the operating handle result in different respective path lengths in the movement of the tool guide and cutting tool.

BRIEF DESCRIPTION OF THE DRAWINGS

The following will explain the invention in more detail with the aid of the attached drawings of a machine embodying the present invention in which.

DETAILED DESCRIPTION OF THE ILLUSTRATED EMBODIMENT

Figure 1:
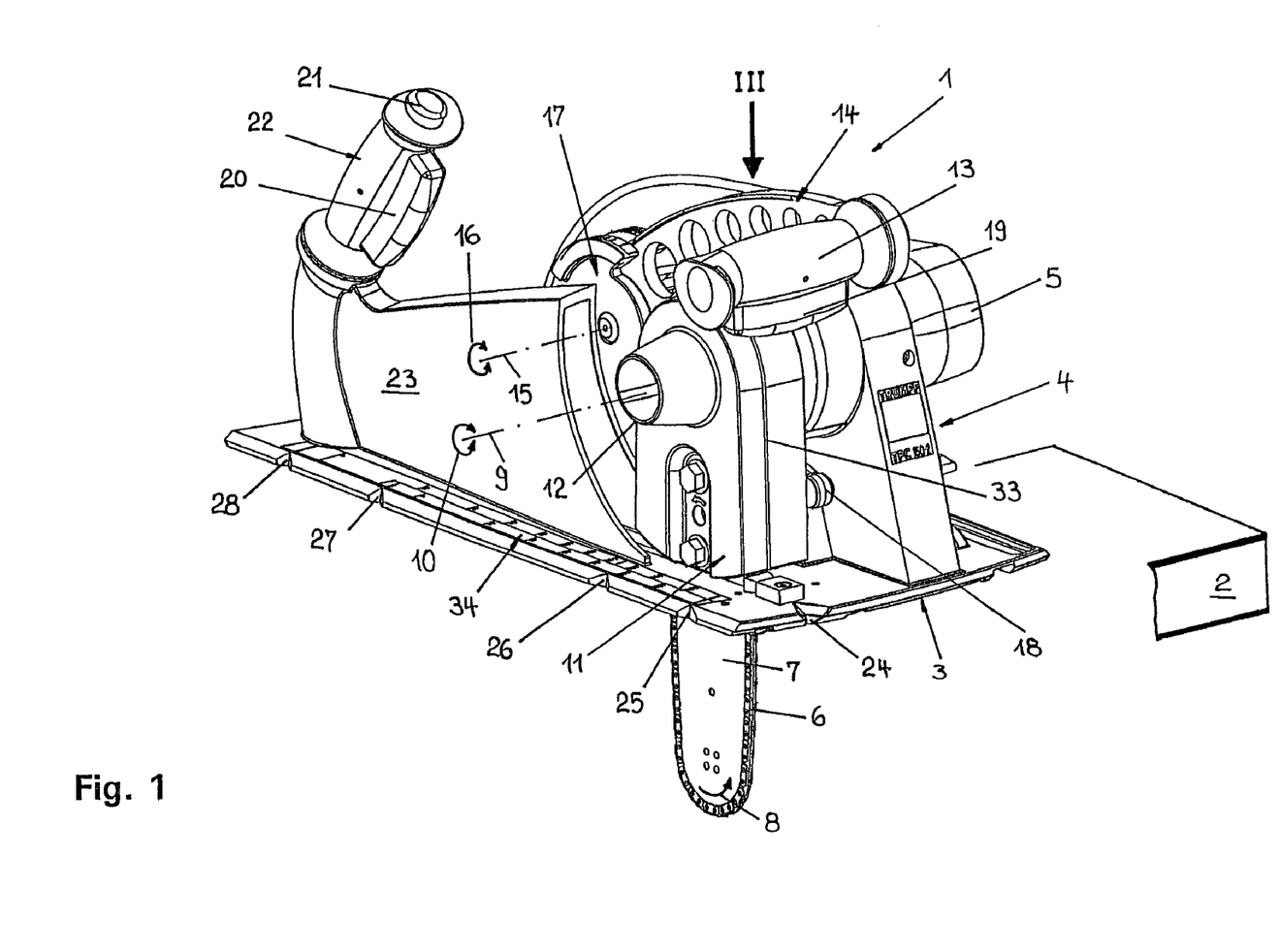
FIG. 1 is a perspective view of the machine for cutting the fragmentarily illustrated sandwiched plate.
Figure 2:
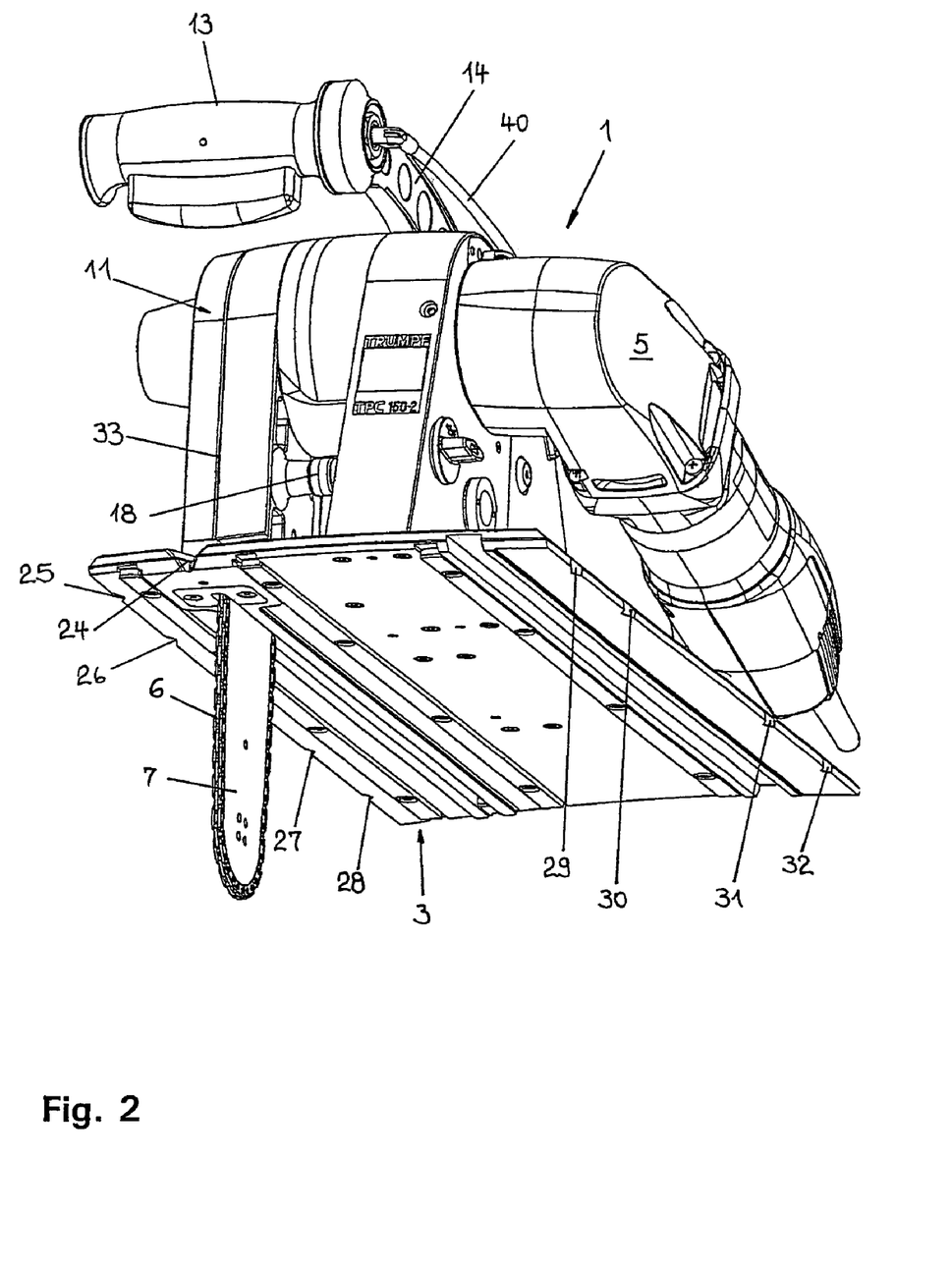
FIG. 2 is a perspective view looking at the machine from a position therebelow.

As can be seen in FIGS. 1 and 2, a machine 1 for cutting sandwich plates or panels 2 includes a base plate 3 supporting a machine housing 4 and an electric drive motor 5 mounted on a flange on the machine housing 4. The motor 5 is functionally connected by a shiftable clutch to the drive wheel of a saw chain 6 that constitutes the cutting tool.

The saw chain 6 revolves around a tool guide 7 in the form of a paddle blade. The direction of travel of the saw chain 6 on the tool guide 7 is indicated by the arrow 8 in FIG. 1. The tool guide 7 with its revolving saw chain 6 is pivotably mounted on the machine housing 4, and it can swivel about the pivot axis 9 in the direction of the double arrow 10 as seen in FIG. 1. A protective enclosure or guard 11 with a suction port 12 covers the area of the swivel mount of the guide 7 on the machine housing 4. The pivotal axis 9 of the guide 7 coincides with the axis of the drive wheel of the saw chain 6.

A handle 13 serves to tilt the guide 7 and is mounted at the free end of a pivot arm 14 on the operator-side. The pivot arm 14 on its part is pivotably mounted for pivoting around a pivot axis 15 in the direction of a double arrow 16 on a bearing block 17 that is connected to the base plate 3. A transmission lever 18, only marginally visible in FIGS. 1 and 2, has one end rotatably attached to the pivot arm 14 on the operator-side and its other end is engaged with the guide 7. The linkage points of the transmission lever 18 are spaced at a distance from both the pivot axis 15 of the operator-side pivot arm 14 and the pivot axis 9 of the guide 7.

Integrated into the operating handle 13 is a pressure switch 19. A pressure switch 20 and a pushbutton 21 are installed on a support handle 22 that is mounted on the base plate 3 of the machine 1. An enclosure 23 serving as the cover for the guide 7 and saw chain 6 extends from the support handle 22 in the direction of the opposite end of the base plate 3.

The edges of the base plate 3 are provided with a number of reference or marker notches. Specifically, these include a marker notch 24 on the blade side transverse edge of the base plate 3 and marker notches 25, 26, 27, 28 on one longitudinal edge and marker notches 29, 30, 31, 32 on the other longitudinal edge of the base plate. The vertex of the marker notch 24 extends in the longitudinal center plane through the narrow ends of the guide 7. It is aligned with a V-shaped longitudinal groove 33 on the guard 11 for the guide 7 and saw chain 6. Also coinciding with the aforementioned longitudinal center plane of the guide 7 is the common center plane of the operating handle 13 and the support handle 22.

Figure 3:
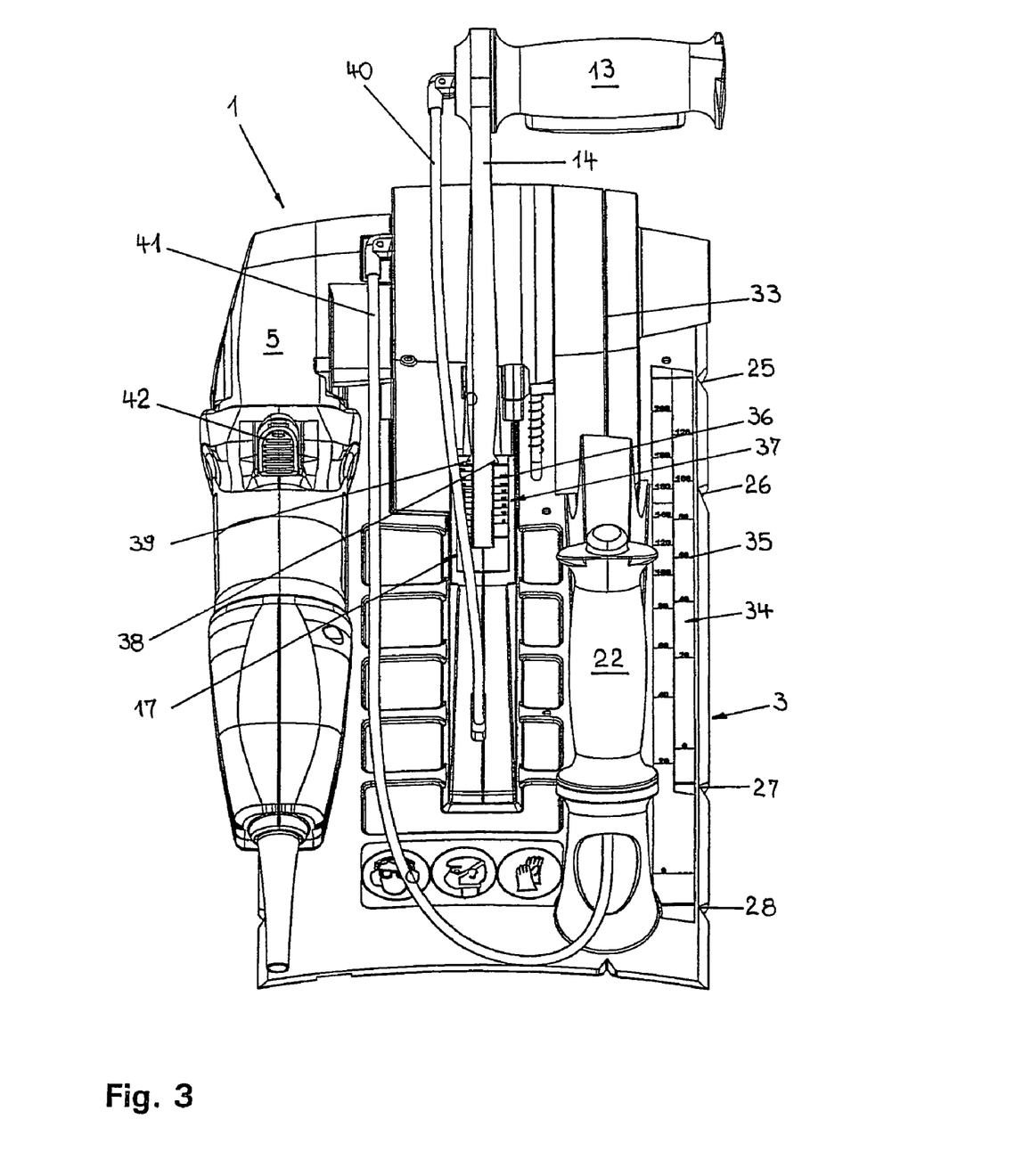
FIG. 3 is a top plan view of the machine of FIGS. 1 and 2 in the direction of the arrow III in FIG. 1.

On the longitudinal edge of the base plate 3, facing the viewer in FIG. 1, a dual scale 34 is provided next to the marker notches 25, 26, 27, 28. As can be seen in FIG. 3, the dual scale 34 features lettered graduation marks 35. These markings 35 match the graduations 36 of a dual scale 37 provided on the bearing block 17 of the operator-side pivot arm 14. As can also be seen in FIG. 3, the operator-side pivot arm 14 is provided with a pointer 38 and, opposite the latter, a pointer 39.

Also shown in FIG. 3 is a Bowden cable 40 extending from the operating handle 13, as well as a Bowden cable 41 extending from the support handle 22. An On/Off switch 42 is located on the top side of the electric drive motor 5.

Figure 4:
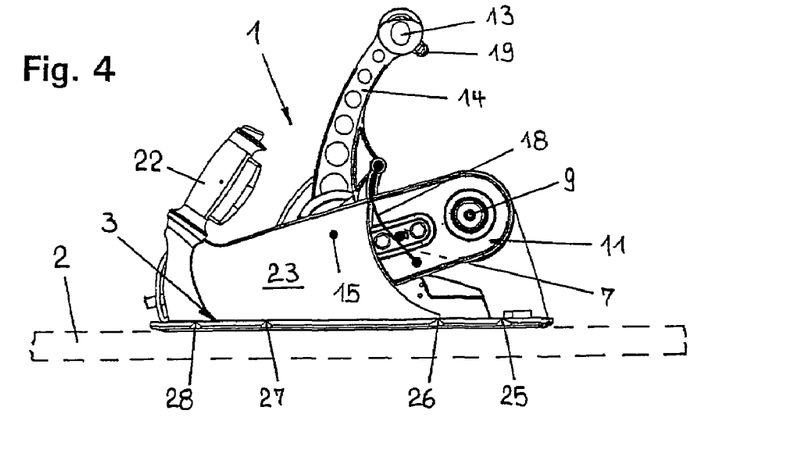
FIGS. 4 to 6 depict the machine in different positions of the pivotable cutting tool as it cuts into a sandwich plate.
Figure 5:
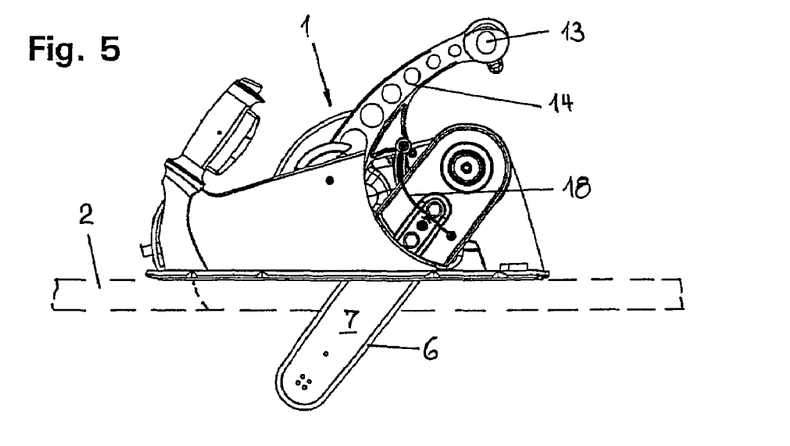
Figure 6:
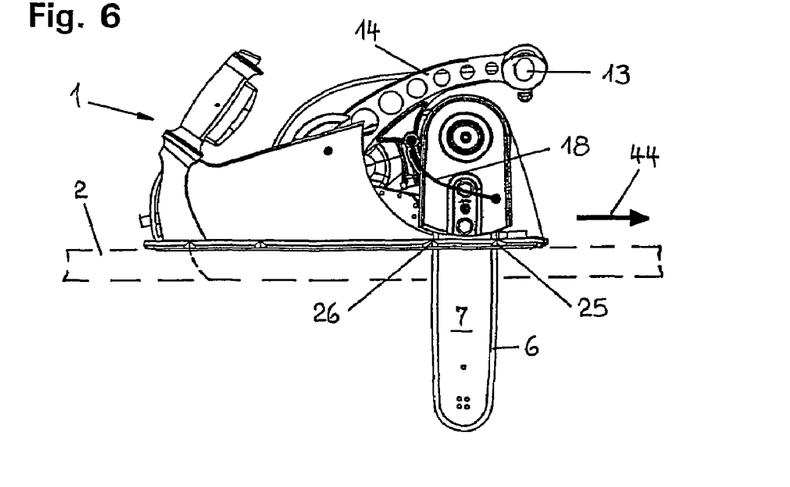

FIGS. 4 to 6 illustrate the functional progression of the operating components of the machine 1 in practical use.

In FIG. 4, the guide 7 with the saw chain 6 is in its idle position. The end of the guide 7, extending beyond the protective enclosure or guard 11, is fully tilted into the interior of the enclosure or blade cover 23. With the electric drive motor 5 switched off, the saw chain 6 is stationary. The base plate 3 of the machine 1 rests on the sandwich plate 2 that is to be processed.

The machine 1 was previously carried to the work area by gripping the operating handle 13 and the operator-side pivot arm 14 in the position shown. In that particular position the machine 1 is well balanced at the operating handle 13. In other words, even in terms of transportation, the machine 1 is user friendly.

As the first step for using the machine 1, the operator moves the On/Off switch 42 on the electric drive motor 5 to the On position. When the drive motor 5 is running, the operator grasps the support handle 22 with one hand and the operating handle 13 with the other hand.

Depressing the pushbutton 21 and then the pressure switch 20 engages the clutch between the drive motor 5 and the drive wheel of the saw chain 6 through the Bowden cable 41, setting the saw chain in motion. The positive drive connection between the drive motor 5 and the drive wheel of the saw chain 6 is maintained for so long as the pressure switch 20 remains depressed. The free end of the guide 7 with the saw chain 6 is at the level of the marker notches 27, 31 or at the level of the marker notches 28, 32, depending on whether the short or the long version of the guide 7, which is available in two lengths, is being used.

After the electric drive motor 5 and with it the saw chain 6 has reached its full rotational speed, the operator depresses the pressure switch 19 on the operating handle 13 and he or she can now move the handle 13 by pivoting the operator-side pivot arm 14 as shown in FIG. 4 in the clockwise direction. Depressing the pressure switch 19 releases a locking device 43, illustrated in FIG. 7 and described in detail hereinafter.

The operator-side pivot arm 14 pivots around its pivot axis 15, and this causes the transmission lever 18 to shift, which in turn pivots the guide 7 around its pivot axis 9. In the process, the guide 7 with its revolving saw chain 6 pivots counterclockwise from its idle position shown in FIG. 4. The guide 7 with its revolving saw chain 6 exits from the blade cover 23 and the saw chain 6 cuts the top surface and into the sandwich plate 2.

In this phase of the cutting process, the guide 7, i.e., the saw chain 6, must exert relatively strong pressure on the sandwich plate 2. Only such relatively strong pressure can overcome the large surface resistance offered by the outer layer of the sandwich plate 2 as the guide 7 with the saw chain 6 starts to cut into it. That notwithstanding, the operator needs to apply only easily mustered initial pressure on the operating handle 13, a fact ensured by the way the variable ratio transmission mechanism, including the operator-side pivot arm 14 and the transmission lever 18 for the guide 7 with saw chain 6, is configured. The fulcrums of the transmission lever 18 on the operator-side pivot arm 14 and on the guide 7 are located correspondingly.

The first, most pressure intensive phase of cutting into a sandwich plate 2 ends when the guide 7 with the saw chain 6 has reached the position relative to the sandwich plate 2 that is shown in FIG. 5. At this point the guide 7 and saw chain 6 are in an attack position on the sandwich plate 2 but have not engaged as yet. For moving the guide 7 and saw chain 6 into their final cutting position, the operating handle 13, with the pressure switch 19 held depressed, must be moved further from its position shown in FIG. 5 in the clockwise direction. The guide 7 and saw chain 6 are at the final point of attack when they have reached the position shown in FIG. 6. At that point the guide 7 with its saw chain 6 extends downwardly, perpendicularly to the sandwich plate 2.

The movement of the guide 7 and saw chain 6 from their position in FIG. 5 into the position in FIG. 6 meets with relatively little resistance. A correspondingly minor amount of pressure needs to be applied to the guide 7 and the saw chain 6 in the direction of the sandwich plate 2. This, too, is reflected in the configurational design of the variable ratio transmission consisting of the operator-side pivot arm 14 and the transmission lever 18, i.e., specifically by virtue of the location of the fulcra of the transmission lever 18 on the operator-side pivot arm 14 and on the guide 7.

A comparison of the pivoting arc through which the operator-side pivot arm 14 has been moved from its position shown in FIG. 4 to its position shown in FIG. 5 and then from its position shown in FIG. 5 into the position shown in FIG. 6, with the correspondingly related pivoting arc of the guide 7 will make it evident that the included angles of the pivoting arcs of the operator-side pivot arm 14 and of the guide 7 are essentially identical for the movement from the position in FIG. 4 into the position shown in FIG. 5. In comparison, in the movement from the position of FIG. 5 into the position in FIG. 6, the included angle of the arc movement of the guide 7 is significantly larger than, the concomitant pivot included angle of the arc of the operator-side pivot arm 14. In the first phase of the cut into the sandwich plate 2, the variable ratio transmission mechanism between the operating handle 13 and the guide 7 works at a transmission ratio of 1:1 and in the second phase, the transmission ratio is 1:0.6. Although the amount of pressure that must be applied on the guide 7 and saw chain 6 in the direction of the sandwich plate 2 changes between phases, the pressure that the operator needs to exert on the operating handle 13 remains essentially the same during the cutting process.

Throughout the overall processing of the sandwich plate 2 and especially throughout the entire cutting process, the operator can tell at any time the position of the guide 7 and saw chain 6 relative to the sandwich plate 2. This is made possible by the dual scale 37 on the bearing block 17 for the operator-side pivot arm 14 and the dual scale 34 on one longitudinal edge of the base plate 3. Which half of the indicator scales 34, 37 is used will again depend on whether the short or the long version of the guide 7 (and saw chain) is employed. The short scale halves are used in conjunction with the short version of guide 7, the long scale halves are used in conjunction with the long guide 7.

As the operator-side pivot arm 14 is pivoted, the pointers 38, 39 move along the dual scale 37. The inscription on the graduation lines 36 of the dual scale 37 indicates in millimeters the depth to which the guide 7 and saw chain 6 extend below the base plate 3, i.e. the depth to which the saw chain 6 has cut into the sandwich plate 2 that is being processed. The same number graduation mark 35 on the dual scale 34 indicates the forward position of the leading edge of the pivoted saw chain 6. Accordingly, the scale 34 shows how far the cut has progressed.

When the guide 7 with its saw chain 6 is in its final active position seen in FIG. 6, the leading edge of the saw chain 6 will be at the level of marker notches 25, 29, and the trailing edge of the saw chain 6 will be at the level of marker notches 26, 30 on the longitudinal outer edge of the base plate 3.

From its position shown in FIG. 6, the machine 1 can be advanced in the forward direction 44 relative to the sandwich plate 2 until the cut has reached the desired length. Particularly useful in this forward movement is the fact that the common central plane of the operating handle 13 and support handle 22 coincides with the center plane of the guide 7. It follows that the point at which the operator begins to apply pressure and the point at which the saw chain 6 engages the sandwich plate 2 are located in exactly the same plane. This facilitates the straight-line advance of the machine 1 in the forward direction 44, which is further aided by the longitudinal groove 33 that extends in the forward direction on the protective enclosure 11 and, its apex aligned with that groove, by the marker notch 24.

When the operator releases the pressure switch 19 while the saw chain 6 is revolving, it forces activation of the Bowden cable 40. This Bowden cable is part of the locking device 43, illustrated in detail in FIG. 7.

Figure 7:
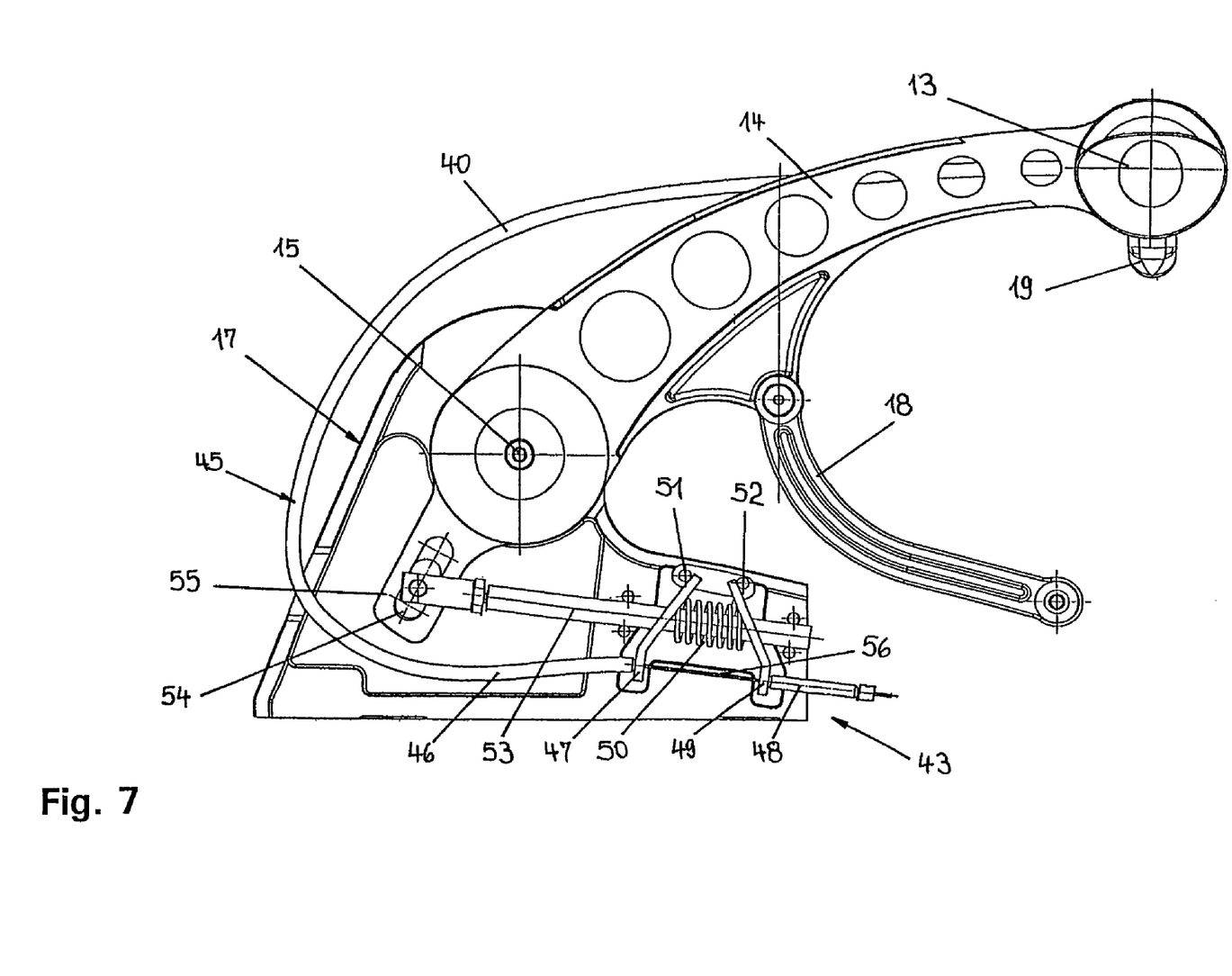
FIG. 7 is a side elevational view of the machine with portions removed to illustrate the swivel arm of the machine and an associated locking device.

As shown in that illustration, the forward section 46 of the flexible tubular sleeve 45 of the Bowden cable 40 is held in place by a forward clamping lever 47, its rearward section 48 is held by a rearward clamping lever 49. A wire 56 extends through the interior of the flexible sleeve 45. A preloaded compression spring 50 pushes the forward clamping lever 47 against a stop 51 and the rearward clamping lever 49 against a stop 52. Extending through the forward clamping lever 47 and the rearward clamping lever 49 is a lock rod 53 that is supported in longitudinally movable fashion on the bearing block 17 of the operator-side pivot arm 14. By way of a gate link 54, the lock rod 53 connects with its forward end to an extension 55 beyond the pivot 15 of the operator-side pivot arm 14.

In the operating state shown in FIG. 7, the lock rod 53 is clamped in a locked position in the longitudinal direction inside its passages through the forward clamping lever 47 and the rearward clamping lever 49. Accordingly, the operator-side pivot arm 14 is locked and prevented from rotating around its pivotal axis 15 in either one of the two possible pivot directions. Consequently, the guide 7, coupled to the pivot arm 14 by the transmission lever 18, is likewise prevented from changing its pivoted position.

Now, if, in the situation shown in FIG. 7, the operator depresses the pressure switch 19 on the operating handle 13, the forward section 46 and the rearward section 48 of the flexible sleeve 45 will shift relative to the wire 56 of the Bowden cable 40. As a result, the forward clamping lever 47 and the rearward clamping lever 49 will move with their lower ends, seen in FIG. 7, toward each other against the action of the compression spring 50. This causes the forward clamping lever 47 and the rearward clamping lever 49 to assume a less-angled position relative to the lock rod 53, unjamming the lock rod 53 in the oversized passages surrounding it in the forward clamping lever 47 and in the rearward clamping lever 49. The lock rod 53 is now free to move in the longitudinal direction. Thus, releasing the lock rod 53 unlocks the operator-side pivot arm 14 with the operating handle 13. The guide 7 with the saw chain 6 is equally free to pivot.

If, at this juncture, the pressure switch 19 is released, the preloaded compression spring 50 will automatically restore the operating state seen in FIG. 7 and will thus automatically lock in position the guide 7 with its revolving saw chain 6.

Thus, it can be seen from the foregoing detailed specification and attached drawings that the novel cutting machine of the present invention is easily manipulated to provide a clean cutting action of sandwich panels and the like.

Having thus described the invention, what is claimed is:

1. Machine for cutting plate-shaped workpieces comprising:
   (a) a housing (4);
   (b) an elongated tool guide (7) pivotally mounted on the housing (4) about a pivot axis that is substantially perpendicular to the direction of elongation of the tool guide;
   (c) a motor-driven cutting tool (6) extending about the tool guide (7) along said direction of elongation, said cutting tool defining a cutting plane;
   (d) a grippable operating handle (13) pivotably supported in the housing (4) and operatively connected to the tool guide (7) to shift the tool guide (7) with the cutting tool (6) along said cutting plane from an idle position to an active position, whereby in its idle position, the cutting tool (6) is disengaged from a workpiece to be cut upon which the machine is placed for cutting the workpiece, and in its active position, the cutting tool is engaged in the workpiece (2) to be cut and;
   (e) a variable ratio transmission mechanism (14, 18) operably connected to said operating handle (13) and the tool guide (7), said variable ratio transmission mechanism having a transmission ratio that varies with the movement of the operating handle (13) as a function of the position of the tool guide (7) and cutting tool (6) as they move between the idle and active positions for cutting said workpiece (2).

2. The cutting machine in accordance with claim 1, wherein the variation of the transmission ratio is selected so that the amount of pressure that must be applied by the operator to move the operating handle (13) from the idle position of the tool guide (7) with its cutting tool (6) into the workpiece being processed and throughout the cutting process is substantially uniform.

3. The cutting machine in accordance with claim 2 wherein the variable ratio transmission mechanism (14, 18) between the operating handle (13) and the tool guide (7) is a transmission lever.

4. The cutting machine in accordance with claim 1 wherein the operating handle (13) is mounted on a first pivot arm (14) on one side of the housing (4) and can be pivoted together with said pivot arm (14) around the pivotal axis (15) of said pivot arm (14).

5. The cutting machine in accordance with claim 4 wherein the tool guide (7) is disposed on said one side of said housing.

6. The cutting machine in accordance with claim 1 wherein there is included at least one scale (37) on a fixed element on said housing and associated with and indicator on said one pivot arm (14) to indicate the respectively current maximum cutting depth of the cutting tool (6) in the workpiece as a function of at least one respectively current position of the operating handle (13) during its movement.

7. The cutting machine in accordance with claim 1 wherein there is included at least one scale (34) on a base plate, said base plate supporting said housing on a workpiece, and said scale indicating the position of the tool guide (7) with its cutting tool (6) relative to the workpiece at the current maximum cutting depth of the cutting tool (6).

8. The cutting machine in accordance with claim 1 wherein there is included a locking device (43) on said housing (4) engageable with said tool guide (17) for automatically locking the tool guide (7) with its cutting tool (6) in a pivoted position assumed during its movement.

9. The cutting machine in accordance with claim 8 wherein the locking device (43) for the tool guide (7) with its cutting tool (6) includes a clamping mechanism with a clamping element, a biasing member urging said clamping element into a clamping position, and a release element to overcome said biasing means.

10. The cutting machine in accordance with claim 1 wherein the operating handle (13) is mounted on said one pivot arm (14), wherein the tool guide (7) is connected to said one pivot arm (14) by a transmission lever (18) providing said transmission mechanism, and wherein there is included a locking device on said housing engageable with said one pivot arm (14) so that the tool guide (7) may be automatically locked in any of its respectively current positions during its movement.

11. The cutting machine in accordance with claim 1 wherein there is included a support handle (22) fixedly mounted on said housing and wherein the operating handle (13) and said support handle (22) are positioned along a line that extends parallel to the feed direction (44) of the tool, whereby, with the tool guide (7) and its cutting tool (6) in their active position, the machine (1) and the workpiece to be processed can be moved relative to each other in the feed direction (44).

* * * * *